Sept. 5, 1967  W. T. RENTSCHLER  3,339,471
PHOTOGRAPHIC APPARATUS FOR EXPOSURE CONTROL
Filed Jan. 27, 1965  3 Sheets-Sheet 1
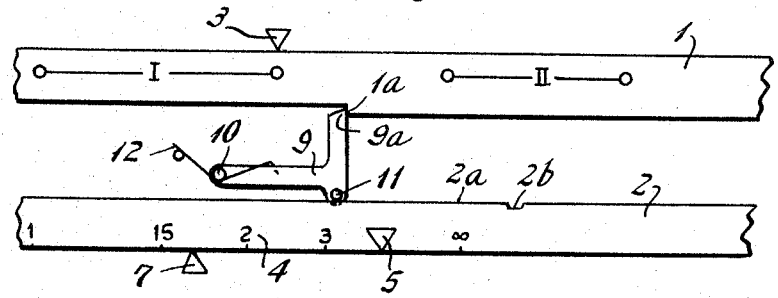
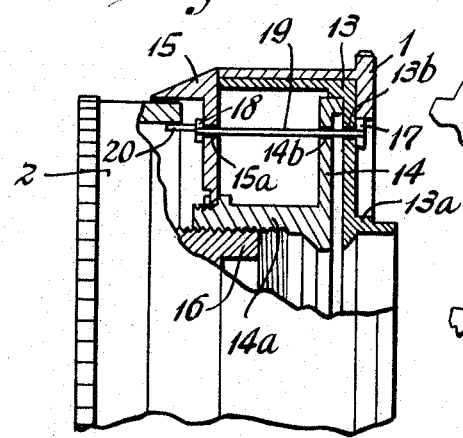
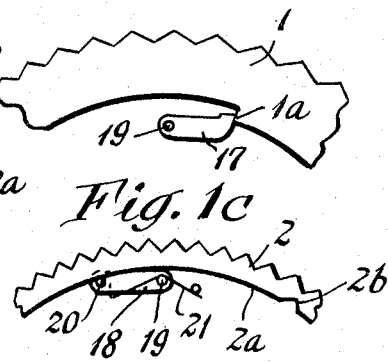
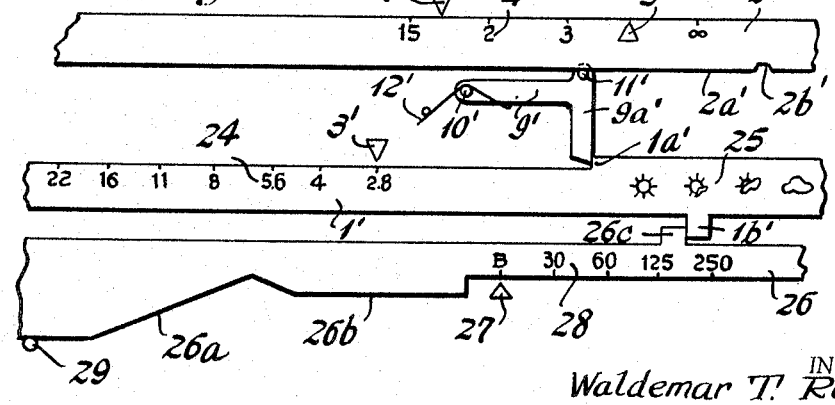
INVENTOR.
Waldemar T. Rentschler
BY
Arthur A. March
ATTORNEY

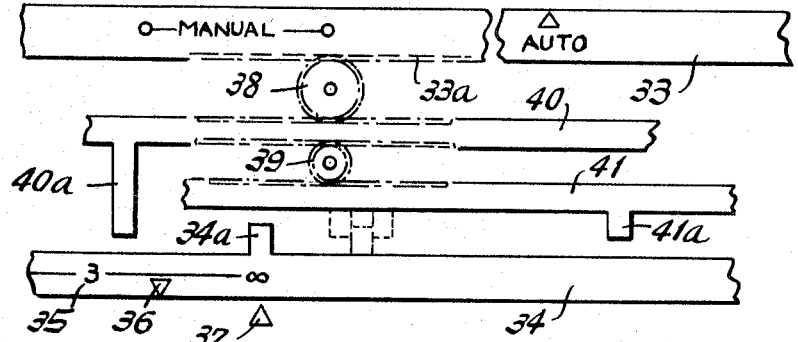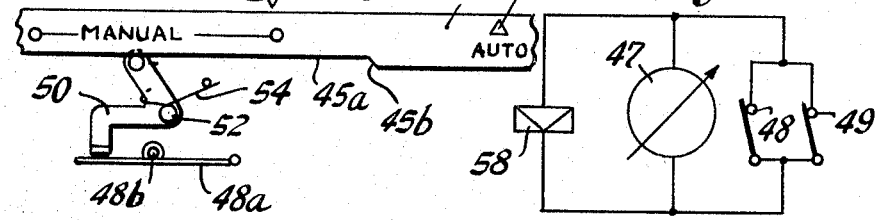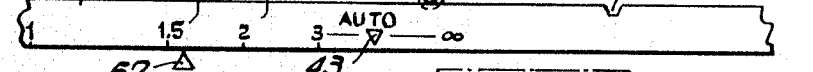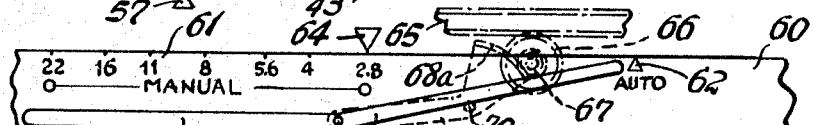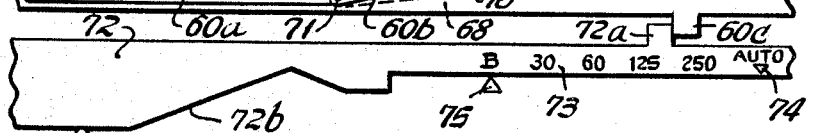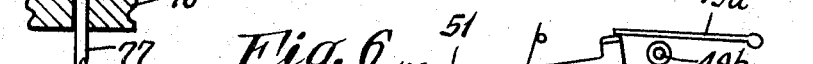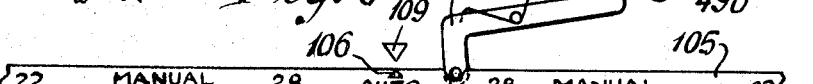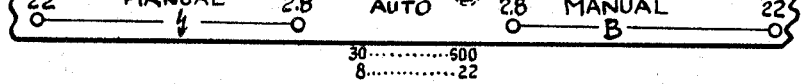

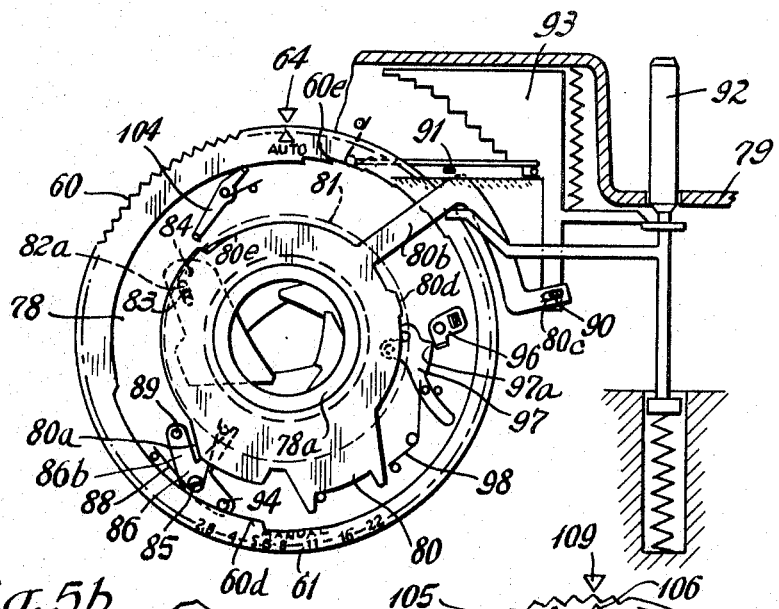

United States Patent Office 3,339,471
Patented Sept. 5, 1967

3,339,471
PHOTOGRAPHIC APPARATUS FOR EXPOSURE CONTROL
Waldemar T. Rentschler, Calmbach (Enz), Germany, assignor to Alfred Gauthier, G.m.b.H., Calmbach (Enz), Germany, a corporation of Germany
Filed Jan. 27, 1965, Ser. No. 428,368
Claims priority, application Germany, Jan. 31, 1964, G 39,750
8 Claims. (Cl. 95—10)

The present invention relates to a photographic camera having setting devices for the diaphragm aperture size and the exposure time which make it possible to set a plurality of related values of these two exposure factors. This camera also has a lens which can be focused to different distances.

In the past few years, various well-known cameras with automatic exposure systems have been developed with a view towards simplifying the effort required of the photographer. For the most part, such cameras are fairly expensive. In all of these cameras the focusing is effected almost entirely by either estimating the distance or by determining the distance by means of a range finder. Such a distance or range setting often requires more time and effort than the photographer is willing to expend, despite the use of an automatic exposure system.

In order to overcome this shortcoming, cameras with automatic exposure systems and "fix-focus" objectives have been developed. In taking photographs with this type of a camera, all that is required of the photographer is merely to look through the view finder and to depress the release member. These cameras are as simple to operate, with respect to the setting of distance, as conventional box cameras.

It has been found, however, that people interested in buying cameras of this type are generally not willing, when paying the correspondingly higher price for a camera with an automatic exposure system, to accept the limitations imposed by a "fix-focus" objective. This attitude of the buyer is based, on the one hand, on the genuine need to be able to effect, in certain cases, an accurate distance or range setting of the camera and, on the other hand, to a certain vanity on the part of some buyers who consider the possession of so simple a camera an affront to their personal prestige. Nevertheless, even, buyers in the latter category have a strong desire to own cameras of optimal operational simplicity and dependability.

It is an object of the present invention to provide a camera which falls within the extremes mentioned above, i.e., a camera which has a plurality of work ranges and permits an easy-to-operate exposure setting within any of the work ranges, combined with a "fix-focus" setting of the objective while, nevertheless, permitting a specific setting of the exposure and of the objective lens in another work range of the camera.

In order to provide these features, the invention essentially proposes that there be provided a selective setting member which can be set in at least two ranges or setting positions. In one of the ranges or setting positions the setting device for the diaphragm can be controlled, in a known manner, in such a way that the resulting diaphragm apertures are always smaller than the largest aperture of the objective and that the operative connection between the selective setting member and the distance setting member of the objective is of such a nature that, for the purpose of setting the selective setting member in the aforementioned range for the corresponding setting position, the distance setting member must first occupy a position or be moved into such a position in which the largest possible diaphragm apertures of the limited diaphragm setting range results in a depth-of-focus range which extends from a fixed, near distance out to infinity. Such an arrangement offers the photographer the opportunity of setting exposures with very specific exposure and distance settings in one work range of the camera and of using the other work range for taking photographs without additional settings of the objective once the camera has been switched into this work range. This makes it possible to operate the camera, in one of the work ranges, in a manner substantially equivalent to the operation of a simple box camera.

In order to eliminate the risk of possible faulty settings, the invention provides a selective locking device which is controlled by the distance setting member and which acts on the selective setting member. The selective locking device permits setting the selective setting member at the range or corresponding setting position which results only in diaphragm apertures that are smaller than the largest aperture of the objective only when the distance setting member occupies the setting position which defines the range from the fixed near distance to infinity. This locking device prevents a switching of the distance setting member as long as the selective setting member is set at the limited diaphragm range.

Another feature of the invention is that the selective locking device has two levers which are rigidly arranged on a shaft which is rotatably positioned on the shutter; one of the levers acts in conjunction with a locking or arresting edge on the selective setting member, while the other lever acts in conjunction with an opening or recess on the distance setting member. Such an arrangement requires a comparatively small number of parts and provides maximum dependability due to the simplicity of construction. Moreover, this arrangement has the additional advantage that it can be built, without significant structural changes, into shutters that are normally used in cameras with range finders coupled to the shutters, because it offers the possibility of using the bearings provided for receiving the pin designed to connect the distance setting member with the range finder for positioning the shaft of the selective locking device.

The invention provides for an additional simplification in a camera comprising a work range designed to be used for manual setting and a setting position designed for automatic exposure setting. The automatic exposure setting is termed "AUTO." An operative connection, by means of gears, exists between the selective setting member and the distance setting member such that upon the selective setting member being reversed or switched to a specific setting position, for example, the position identified by the word "AUTO," the distance setting member is moved into the setting position which defines the range from the fixed near distance to infinity.

In accordance with another feature of the invention, a structurally simple operative connection between the selective setting member and the distance setting member, which insures maximum dependability, is possible in that there are provided two racks driven by fixed pinions or two rings provided with teeth. The racks or rings have driving lugs, or flanges, with which a driver or catch, arranged on a distance setting member, is operatively associated. Owing to this positive arrangement, the photographer when, for example, switching the camera from the manual work range to the "AUTO" setting position merely has to move the selective setting member which causes the distance setting member to be moved positively into the setting position which defines the range from the fixed near distance to infinity.

Another modification of the present invention is provided for photographic cameras which, in addition to having the setting device for diaphragm and exposure time and an objective which may be set at a plurality of distance values, are also provided with an exposure meter and with a device designed to effect the automatic setting of at least one exposure factor and which becomes operative when the selective setting member is set at the "AUTO" setting position. This modification provides that there be associated both with the selective setting member and with the distance setting member two short-circuit switches located in the circuit of the exposure meter and that they be operated in such a manner that the two switches are open only when the selective setting member occupies the "AUTO" setting position and the distance setting member occupies the setting position which defines the range from fixed near distance to infinity. The arrangement of the short-circuit switches is particularly advantageous in the case of those selective setting members which, when being switched from the manual work range to the "AUTO" setting position and vice versa, have only to travel a comparatively small distance.

Finally, another feature of the invention is that the selective setting member is provided with a ramp or slope which acts on the adjusting lever designed to serve for the diaphragm setting. When the selective setting member is switched to the "AUTO" setting position, the ramp or slope portion of the selective setting member effectively causes the diaphragm actuating ring to move into the setting position which results in a diaphragm aperture smaller than the largest aperture of the objective.

Details of the invention will become apparent from the specification which follows and the accompanying drawings which illustrate several embodiments and applications of the invention and in which:

FIG. 1 shows the manual setting members of the camera, illustrated as slides for the sake of clarity, which act in conjunction with a selective reversible locking device. One of the members serves both for setting the exposure and for selectively switching the camera from one work range I to the other work range II, while the other setting member is designed to serve for focusing the objective;

FIG. 1a shows the manner of installation of the selective reversible locking device in an intra-lens shutter, part being broken away to show the interior, which is provided with a manually operable exposure setting member and a manually operable distance setting member;

FIG. 1b is a top view of a fragment of the setting or selective setting member provided with a locking or arresting edge and shows, as well, the lever arm of the selective locking device, which lever arms acts in conjunction with the setting member;

FIG. 1c is a top view of part of the distance setting member provided with a notch and the lever arm of the selective locking device, which arm is associated with the distance setting member;

FIG. 1d is a perspective view of the selective locking device;

FIG. 2 is an arrangement similar to that of FIG. 1 with an exposure time setting member additionally associated with the selective setting member which serves as a diaphragm setting member and has one setting range identified by a diaphragm value scale and another setting range identified by a symbol scale;

FIG. 3 shows an embodiment which provides for an operative connection, by means of gears, between the selective setting member and the distance setting member of the camera, this connection moving the distance setting member into the "fix-focus" position (shown by the broken line) when the selective setting member is switched to the "AUTO" setting position;

FIG. 4 is an embodiment specially provided to be used in cameras with an automatic exposure system. The selective setting member comprises a "MANUAL" setting range as well as an "AUTO" setting position, while short-circuit switches are associated with both the selective setting member and with the distance setting member, the short-circuit switches being operative when the respective setting member occupies a position other than the "AUTO" position;

FIG. 4a shows the arrangement of the short-circuit switches of FIG. 4 in the circuit of a photo-electric exposure meter;

FIG. 5 is a diagrammatic view of an arrangement which is used in cameras with automatic diaphragm settings and manual preselection of the exposure time. A gear arrangement, such as the one shown in FIG. 3, in conjunction with a cam controlled adjusting lever are provided between the selective setting member and the distance setting member;

FIG. 5a shows the use of the arrangement illustrated in FIG. 4 on an intra-lens shutter designed to be built into cameras with both light responsive and manual diaphragm settings. A rear view of the intra-lens shutter being set at the "AUTO" position is shown;

FIG. 5b shows, on an enlarged scale, the adjusting lever acting in conjunction with the selective setting member and with the diaphragm control ring operable by the sensing device with the camera arrangement shown in FIG. 5;

FIG. 6 shows another embodiment of a selective setting member having application in cameras with light-responsive program exposure settings, the setting member comprising, in addition to the "AUTO" position, two setting ranges within which the exposure setting can be effected manually;

FIG. 6a shows the rear of an intra-lens shutter for cameras with program exposure settings in the "AUTO" position, whereby the light-responsive exposure setting is carried out by means of a sensing device in the same manner as that shown in the arrangement of FIG. 5a;

FIG. 7 shows an indicating device associated with the exposure meter used in conjunction with the shutter arrangement of FIG. 6a; and FIG. 8 shows another indicating device which is preferably used in conjunction with the shutter arrangement of FIG. 5a.

Referring to FIG. 1, there is shown a manually operable exposure setting member 1, for example, a diaphragm or exposure value setting member, and a manually operable objective focusing control, or distance setting member 2. While these setting members have been illustrated as linearly movable slides for purposes of clarity, it is to be understood that these setting members may also be made in the form of rings, as shown in FIGS. 1a through 1c. The setting member 1, designed to serve for the exposure setting, is composed of two setting ranges I and II which act in conjunction with a fixed mark 3. The setting member 2 provided for the setting of the objective or lens assembly carries a distance scale 4 which is provided with a special setting mark 5 in the range between a fixed near distance, for example, 3 meters, indicated as "3m," and the symbol "∞." The special setting mark 5, the importance of which will be explained in detail below, occupies the position of the scale value "6" in the embodiment shown in FIG. 1. Mark 5, thus, corresponds to the distance value "6m" and may be termed the "fix-focus" setting position for reasons to be explained below. If the mark 5 is made to coincide with a fixed mark 7, the objective will occupy a setting position which insures a sufficient depth of focus for the corresponding diaphragm setting.

Provided that the exposure setting member 1 is properly coupled, in the usual manner, to the setting device for the diaphragm, the range I may, for example, include a scale composed of diaphragm values from "22" to "2.8," while the range II may include a scale composed of diaphragm values from "22" to "8." Thus, the setting range II is limited, as to the largest diaphragm aperture, to a maximum value of "8." This means that only diaphragm values from "22" to "8" are available within the setting range II whereas the full diaphragm aperture range is available in the setting range I. Since the exposure setting member 1 is to be used not only for setting a specific diaphragm or exposure value within the respective setting ranges I and II, but, in addition, for selectively switching the camera from one setting range to the other setting range, it may be termed a selective setting member and will be referred to as such throughout the remainder of this specification and the claims.

In the embodiment of FIG. 1 the "fix-focus" setting position of the distance setting member 2 is associated with the setting range II of the selective setting member 1. This means that when the camera or the selective setting member 1 is switched into range II, a specific setting of the distance may be dispensed with and instead the distance setting member 2 is simply moved into the "fix-focus" setting position at which the marks 5 and 7 are opposite each other. In order to allow for practical considerations, the setting range II, in contrast to setting range I, may comprise only those diaphragm values which insure a sufficient depth of focus. With an objective having a focal length of 45 mm., for example, which is generally used for miniature cameras, the depth of focus zone for the maximum diaphragm aperture "8" would, thus extend approximately from "3m" to ∞.

In order to make the operation of the camera being described as simple as possible, and in order to insure that specific distance values can be associated with each of the individual diaphragm values in the setting range I, provision is made to permit a switch to the setting range II only after the distance setting member 2 has first been moved into the "fix-focus" setting position, i.e., after the mark 5, on member 2, has been moved to coincide with the fixed mark 7. This may be accomplished, for example, by a suitable selective or reversible locking device which cooperates with the setting members 1 and 2. For the embodiment shown in FIG. 1, where the setting members 1 and 2 are in the form of slides, the locking device may consist of a lever 9, one end of which is pivotally mounted on a pin 10 and the other end of which comprises a transverse bolt 9a. The transverse bolt 9a cooperates at one end with an arresting or locking edge 1a on the selective setting member 1. This arrangement is such that when the selective setting member 1 is switched from setting range I to setting range II, it runs against the transverse bolt 9a unless the distance setting member 2 has first been moved into the "fix-focus" position. At the other end of the transverse bolt 9a is a pin 11 which is pressed against a lateral edge 2a of the distance setting member 2 due to the influence of a spring 12 acting on the locking device 9. The lateral edge 2a has an opening or notch 2b which is so arranged with respect to the "fix-focus" position of the setting member 2, that the pin 11 of the locking device 9 enters the opening when the mark 5 of the distance setting member is moved to a position opposite the fixed mark 7. When this occurs, the selective setting member 1 can be moved unobstructedly from setting range I to setting range II. The selective setting member 1 can, thus, be set within range II at a plurality of diaphragm values while the objective is set at a fixed position and includes the distance range from a specific near distance to "infinity."

FIG. 1a shows an intra-lens shutter wherein the setting members 1 and 2 for diaphragm and distance, respectively, are in the form of setting rings arranged concentrically about the lens axis. A housing 13 having a tubular connection 13a is provided for this intra-lens shutter. A base plate 14 designed to be used for the arrangement or positioning of the shutter drive mechanism is arranged within the shutter housing 13. The base plate 14 is provided with a tubular connection 14a on which there is fixed a front plate 15 which closes off the front of the shutter housing. The tubular connection 14a is provided with an internal thread which receives an axially movable front lens mount 16 provided with a matching thread. The front lens mount 16 does not rotate relative to the distance setting member 2. On the other hand the selective setting member 1 having the two setting ranges I and II, is rotatably positioned on the tubular connection 13a at the rear of the shutter housing 13.

For an intra-lens shutter such as the one shown in FIG. 1a, the selective locking device may take a form such as the one shown in FIGS. 1a and 1d. Referring to FIGS. 1a and 1d such a device may include two levers 17 and 18, which are arranged in the operative range of the two setting members 1 and 2 and which, in turn, are rigidly affixed to a shaft 19. A pair of openings 14b and 15a are provided in the base plate 14 and the front plate 15, respectively, for positioning the shaft 19. These openings extend parallel to the lens axis and are coaxial with each other. The shaft 19 also passes through the shutter housing 13 at a point designated by reference numeral 13b. If required, the shaft 19 may be positioned by utilizing openings of the type which are normally provided in the base or front plate of shutter type cameras with range finders for receiving the pin which operatively connects the range finder to the distance setting member.

The lever 17 functions in a manner analogous to the selective locking device 9 of FIG. 1. This is most readily apparent from FIG. 1b wherein an arresting or locking edge 1a is provided on the selective, or exposure, setting member 1 of the camera. The lever 18 associated with the distance setting member 2 carries at its free end a pin 20 which is continually kept in engagement with the inner periphery of the distance setting member due to the action of the spring 21. An opening or notch 2b is provided in the inner circumference of the distance setting member 2 similar to the opening or notch 2b in FIG. 1. The pin 20 of the selective locking device enters the opening of notch 2b when the distance setting member 2 has been moved into the "fix-focus" position. Although this is not shown in FIG. 1c, the action is similar to that previously described in connection with the embodiment of FIG. 1.

FIG. 2 shows another arrangement of the invention which is similar to the embodiment of FIG. 1. Elements in FIG. 2 corresponding to elements in FIG. 1, have been given the same reference numerals followed by a prime ('). Since the embodiments in FIGS. 1 and 2 are similar, a detailed explanation of the arrangement of the setting members 1' and 2' for diaphragm and distance, respectively, and the cooperation of the setting members, as effected through the selective locking device 9', will be omitted. It is sufficient to point out that the setting range, defined by I in FIG. 1, is identified in the embodiment of FIG. 2 by a diaphragm scale 24 comprising the values from "22" to "2.8" and that the setting range II is identified by a symbol scale 25 which corresponds with specific diaphragm values in the order of magnitude from "22" to "8."

Also included in the embodiment of FIG. 2 is an exposure time setting member 26 having an exposure time scale 28 which cooperates with a mark 27. The exposure time setting member 26 is, in addition, operatively associated with the selective setting member 1'. There is associated with the exposure time scale 28 a control cam 26a which sets an exposure time escapement mechanism which may be of conventional construction and operation. Since the setting of the exposure time escapement mechanism may be effected by any well known transmission means, the transmission means is represented in FIG. 2 only by a pin 29 which would be mounted on the braking or arresting lever of the escapement mechanism. The pin 29 is kept in continuous engagement with the cam 26a.

The exposure time setting member 26 also has a second cam section 26b which serves to set the escapement mechanism at a specific exposure time. For the condition illustrated in the drawing, the exposure time is $\frac{1}{125}$ sec. The overall length of cam section 26b is at least as long as the symbol scale 25 on selective setting member 1'. This means that upon switching the camera to the limited setting range identified by the symbol scale 25, the exposure time is set at a specific value, namely at 1/125 sec., and that this value is maintained over the entire setting range of the symbol scale. In order to operatively connect the selective setting member 1' to the exposure time setting member 26, the two members are provided with driving lugs 1b' and 26c by means of which the exposure time setting member 26 is always carried along to such an extent that the pin 29 moves into the cam section 26b upon the selective setting member 1' being set at a specific symbol of the symbol scale 25.

The embodiments of FIGS. 1 and 2 are provided primarily for cameras in which the setting of the diaphragm or of the objective is effected by means of manually operable setting members. In such cameras the selective setting member may also be coupled by way of a readjusting technique of known construction to a photo-electric exposure meter built into the camera. In such a case, a manually operable selective setting member would have to be readjusted after the distance setting member has been moved into the "fix-focus" setting position until a resetting or readjusting indicator or pointer, operatively connected to the selective setting member, has been brought into coincidence with the pointer of the measuring mechanism. In addition, the two setting ranges I and II in the FIG. 1 embodiment may be exposure value scales. This presupposes that the selective setting member acts, via well-known means, not only on the diaphragm but also on the exposure time escapement mechanism.

FIG. 3 shows a selective setting member 33 which acts in conjunction with a fixed mark 32 on which is marked, in addition to a "MANUAL" setting range, another single setting position designated by the word "AUTO." In this embodiment, the selective setting member 33 may co-operate either with the diaphragm alone or else with both the diaphragm and the exposure time escapement mechanism. In the former case, the "MANUAL" setting range would simply have to include a diaphragm scale, while for the latter case, it would have to include an exposure value scale.

As to the "AUTO" position, it is identical to the setting range II of the selective setting members 1 or 1' of the embodiments of FIGS. 1 and 2, respectively. In a manner similar to the arrangements of FIGS. 1 and 2, the selective setting member 33 is associated with a distance setting member 34 which carries a distance setting scale 35. This scale also has, in the range between a specific near distance of "3m" and "∞", the so-called "fix-focus" position which is indicated by the mark 36. A fixed mark 37 cooperates with the distance setting member 34.

Instead of the previously described selective locking devices illustrated in FIGS. 1 and 2, an operative connection, by means of gears, may be provided between the selective setting member 33 and the distance setting member 34. Although this connection permits a specific distance setting in the "MANUAL" setting range, it moves the distance setting member 34, operatively connected to the objective, into the "fix-focus" position when the camera is switched into the "AUTO" setting position. This movement may be effected, for example, by oppositely movable racks or rings 40 and 41 provided with teeth driven by fixed pinions 38 and 39. In addition, the selective setting member 33 is provided with teeth 33a which engage the pinion 38. In order to obtain a driving connection between the racks or rings 40 and 41 with the distance setting member 34, the racks or rings may be provided with driving lugs 40a and 41a. A driving arm 34a on the distance setting member 34 is projected into the path of motion of the driving lugs 40a and 41a. The arrangement of the driving lugs 40a and 41a, with respect to the driving arm 34a, is such that when the selective setting member 33 is switched into the "AUTO" position, the distance setting member is moved into the setting position, indicated by the dotted lines, which corresponds to the "fixed-focus" setting position in which case the mark 36 is opposite the fixed mark 37.

FIGS. 4 and 4a show an arrangement of the invention which is especially provided for cameras with manual and automatic exposure setting in response to the measured result of an exposure meter built into the camera. In describing the structure and operation of the arrangement shown in FIGS. 4 and 4a, reference should also be made to FIG. 5. Instead of using what may be termed a positive guide arrangement such as has been previously described, it is possible to use, in the embodiment in FIGS. 4 and 4a, a contact switch arrangement which can be controlled both by a selective setting member 45 and by a distance setting member 46. Referring to FIGS. 4, 4a and 5, the contact switch arrangement may comprise two short-circuit switches 48 and 49, which are arranged in parallel relationship in the circuit of an exposure meter 47. The switches 48 and 49 may take the form of contact springs 48a and 49a having fixed contact pins 48b and 49b. Associated with the two contact switches 48 and 49 are two-armed actuating levers 50 and 51, respectively, which, in turn, are positioned on fixed pins or pivots 52 and 53, respectively, and are caused to engage control edges 45a and 46a, respectively, of the selective setting member 45 and the distance setting member 46 due to the action of two springs 54 and 55, respectively.

The edges 45a and 46a are provided with a ramp or slope portion 45b and an opening or notch 46b, respectively, so that upon movement of the selective setting member 45 with a distance setting member 46 into the "AUTO" position, identified by the marks 42 and 43 respectively, the two short-circuit switches 48 and 49 are open. The effect of this is that the exposure meter 47 receives a current from the photocell 58 having a magnitude dependent upon the prevailing light conditions. If, on the other hand, the "MANUAL" setting range of the selective setting member 45 or a specific distance value of the scale 59 on the distance setting member 46 is placed opposite the fixed setting marks 56 and 57, the contact arms 48a and 49a come into contact with the fixed contact pins 48b and 49b thereby preventing current flow to the exposure meter 47. The result is that the rotating or moving coil of the meter is returned to a specific end position due to the action of a return or restoring spring. Consequently, the device just described, designed for automatic exposure setting, is able to fulfill its function only when both the selective setting member 45 and distance setting member 46 have first been moved into the "AUTO" position.

The arrangement illustrated in FIG. 5 is provided for photographic cameras which are equipped with a device for setting, either manually or automatically, the diaphragm in response to prevailing light conditions with manual preselection of the exposure time. The selective setting member 60, designed to serve for exposure setting as well as for switching the camera from one range to the other, comprises a "MANUAL" setting range provided with a diaphragm scale 61 as well as an "AUTO" setting position provided with the setting mark 62. The diaphragm scale 61 and the setting mark 62 act in conjunction with a fixed mark 64. A distance setting member (not shown in FIG. 5) is in operative connection, by means of gears, with the selective setting member 60. The mechanical gearing provided for this purpose is indicated simply by a rack 65 which may be a component of a gear arrangement such as the one described in detail above and shown in FIG. 3. A fixed gear 66 engages the rack 65 and is coupled to a two-armed adjusting lever 68 having a toothed segment 68a by way of another pinion 67 which rotates with the gear 66. The adjusting lever 68 is arranged to rotate about a fixed pin or pivot 70 and carries at one end a pin 71 which is engaged in a slot in the selective setting member 60. This slot has a first cam section 60a which extends horizontally in FIG. 5 and a second cam section 60b which is seen to ascend obliquely. The cam section 60a is such that its length corresponds to the length of the diaphragm setting scale 61. This means that upon motion of the selective setting member 60, the adjusting lever 68 remains unaffected in the "MANUAL" setting range. Only after the selective setting member 60 is moved into the "AUTO" position the gear connection to the distance setting member (not shown in the drawing) affected in such a manner that the distance setting member (not shown) finally reaches the "fix-focus" setting position due to the engagement of the obliquely ascending cam section 60b.

An exposure time setting member 72 may be associated with a selective setting member 60 for the purpose of preselecting the exposure time. The member 72 has, in addition to the exposure time scale 73, a mark 74 which is associated with the "AUTO" position of the selective setting member 60 and is provided with the word "AUTO." The mark 74 can be moved into a position opposite fixed mark 75. A specific exposure time value for example $1/60$ sec. or $1/125$ sec. may be associated with the "AUTO" position of the exposure time setting member 72. This exposure time value will be set when the selective setting member 60 is moved into the "AUTO" position. To accomplish this, selective setting member 60 and the exposure time setting member 72 are provided with the driving arms 60c and 72a, respectively, by means of which the exposure time setting member 72 is moved into the "AUTO" position when the selective setting member 60 is moved into the "AUTO" position. In order to reflect the set exposure time value in the exposure meter, the exposure time setting member 72 carries a cam 72b, the position information of which is transferred to the exposure meter by way of a pin 77 arranged to move up and down in a fixed guide 76.

FIG. 5a shows the selective setting member 60 on a photographic intra-lens shutter along with the interaction between the selective setting member and its diaphragm mechanism. The housing of the shutter is represented by reference numeral 78, while the case or housing of the camera is represented by reference number 79. An iris diaphragm to be described in detail below, which can be set in different aperture settings, is arranged in the shutter housing 78. The setting of this diaphragm is effected by a setting ring 80 which is rotatably positioned on a tubular connection 78a of the shutter housing 78 and which cooperates with an actuating ring 81 arranged on the inside of the rear wall of the shutter housing. The sector-like lamellae 82 of the iris diaphragm are in pin/slot connection 83, 82a with the actuating ring 81. In addition, the diaphragm lamellae 82 carry bearing pins 84 which engage in bores of a bearing plate (not shown in the drawing for the sake of clarity) which are fixed to the inside of the rear wall of the shutter 78.

Arranged on the rear wall of the shutter 78 is a pin 85 on which there is positioned a three-armed diaphragm setting lever 86. This lever is designed to establish the operative connection of the setting or actuating rings 80 and 81 which control the diaphragm lamellae 82. A radially extending arm 86a of the diaphragm setting lever 86 is associated with the diaphragm actuating ring 81 which is provided with a pin 87 and is acted on by a spring 88. The arm 86b cooperates with the setting ring 80 having a cam 80a. The arm 86b carried at its free end a pin 89 which slides on the cam 80a when the setting ring 80 is rotated. The arrangement of the cam 80a is such that upon the setting ring 80 being rotated clockwise out of the starting position shown in FIG. 5a, the diaphragm actuating ring 81 is moved simultaneously in the same direction of rotation by the diaphragm setting lever 86. During this process, the diaphragm lamellae 82 swing up from the starting position illustrated in FIG. 5a toward the smallest aperture width.

For the light-responsive setting of the diaphragm lamellae 82 in the "AUTO" position of the selective setting member 60, the setting ring 80 is provided with a radially extending actuating arm 80b which cooperates at its free end by means of a pin/slot connection 90, 80c with a conventional sensing device 93 which senses the position of the pointer 91 of the exposure meter and can be moved together with the camera release member 92.

As is especially apparent from FIGS. 5a and 5b, the selective setting member 60 is provided with a ramp or slope 60d which, acting in conjunction with a pin 94 provided on the diaphragm setting lever 86, influences, upon the selective setting member 60 being set at the "AUTO" postion, the diaphragm lamellae 82 to close in such a manner that the resulting aperture width is smaller than the largest aperture of the objective. During this movement, the pin 89 of the diaphragm setting lever 86 is guided off the cam 80a in such a manner that, upon the sensing device being actuated, the setting ring 80 must first travel in angular range of $\alpha°$ before the cam 80a, again engages the pin 89 of the diaphragm setting lever 86. Only after further movement of the setting ring 80 will the cam 80a again be able to become operative on the diaphragm setting lever 86, i.e., to have a further effect on the diaphragm lamellae 82 in the direction of closure.

In order to render the arrangement, just described, reliable, and to avoid faulty exposures, provision may be made for a locking device 97 which is associated with the release lever 96 and which prevents the release of the shutter, if the prevailing light conditions and the preset exposure time value will bring about a diaphragm value which is outside the aforementioned limited diaphragm range. The locking device 97 which is acted upon by a spring 98 is provided with a supporting edge 97a which prevents the release of the shutter if the diaphragm setting does not insure the right exposure. This means that a release of the shutter takes place only when cam 80d, provided on the setting ring 80 and adjusted to the limited diaphragm aperture range, moves the locking device out of the range of motion of the release lever 96.

Instead of providing a locking device to avoid faulty exposures, the camera arrangement shown in FIG. 5a may be provided with an indicating device such as the one shown in FIG. 8. This indicating device may be formed of a viewing field 100 comprising two juxtaposed indicating fields 100a and 100b of different colors, for example, one a red field and the other a green field, as well as an indicating field 100c which is associated with the two fields and which is provided with a diaphragm scale 101. As is apparent from FIG. 8, the diaphragm values "2.8" to "8" may be associated with the indicating field 100a and the diaphragm values "8" to "22," available exclusively in the case of automatic diaphragm setting, may be associated with the indicating field 100b. A pointer 102 connected to the exposure meter cooperates with the indicating fields 100a, 100b and 100c. FIG. 8 shows the pointer 102 in such position that useful exposures can be expected with the camera set for automatic diaphragm setting. If the pointer 102 is positioned within the indicating field 100a, this would indicate that the prevailing light conditions will result in a diaphragm aperture which is outside the diaphragm setting range associated with the "AUTO" position of the selective setting member 60. This means that the camera must be switched to the "MANUAL" setting range.

The indicating device may be provided with a mask 103, having a viewing window 103a which can be moved in the direction of the arrow shown in FIG. 8 by the selective setting member 60. The arrangement of the mask 103 may be such that the diaphragm scale 101 is removed from view when the selective setting member 60 is in the "AUTO" position and that the indicating fields 100a and 100b are removed from view in the "MANUAL" position of the selective setting member 60.

As indicated above, the selective setting member 60 comprises, in addition to the "AUTO" position, a "MANUAL" setting arrangement within which the diaphragm setting can be effected by way of the diaphragm scale 61. For this purpose, the selective setting member 60 is provided with a cam 60e which also cooperates with a pin 94 of the diaphragm setting lever 86. The ramp 60d and the cam 60e are so arranged on the selective setting member 60 that in case the selective setting member is moved into the "MANUAL" setting range, the ramp 60d first releases the diaphragm setting lever 86 so that the diaphragm actuating ring 81 is able to return, due to the action of the spring 88, to the starting position which corresponds to the largest diaphragm aperture. Upon further rotary movement, the cam 60e engages the pin 94 of the diaphragm setting lever 86 whereupon the diaphragm lamellae 82 are moved into closing position to a greater or lesser extent depending on the specific diaphragm value that has been set. In order to eliminate the influence of the cam 80a of the setting ring 80 upon the diaphragm setting lever 86 under a manual diaphragm setting operation, a locking bolt 104 is provided. One end of the locking bolt 104 engages the selective setting member 60 while the other end cooperates with a locking or arresting edge 80e of the setting ring 80.

FIG. 6 illustrates a selective setting member 105 of the type which can be used in the automatic range in cameras with program settings. In this type of camera, the selective setting member 105 comprises an "AUTO" setting position in which it is possible to use exposure time values in the order of magnitude of ⅟₃₀ sec. to ⅟₅₀₀ sec. combined with diaphragm values ranging from "8" to "22". The "AUTO" positions is identified by a mark 106. Associated with the "AUTO" position and disposed on either side of the mark 106 are a "MANUAL-FLASH" and "MANUAL-B" manual setting range designed to be used for a manual diaphragm setting. The mark 106 as well as the diaphragm scales provided in the "MANUAL-FLASH" setting range and in the "MANUAL-B" setting range cooperate with a fixed mark 109. The setting range "MANUAL-FLASH" is designed for flash-light exposure and a single exposure time, for example ⅟₃₀ sec., may be associated with the entire diaphragm setting range. On the other hand, the arrangement of the "MANUAL-B" setting range may be such that simultaneously with the setting of this range, conventional means for obtaining B-exposures are connected, which retain the shutter in open position for the duration of the depression of the shutter release lever after the shutter plates have been released and opened.

In order to insure that the selective setting member 105 and the distance setting member (not shown in the drawing) are actually in the appropriate "AUTO" positions which they should occupy when exposures with automatic exposure settings are effected, it may be expedient to use a contact arrangement such as the one shown in FIG. 4. For the sake of clarity, FIG. 6 merely shows the short-circuit switch 49a, 49b operatively associated with the selective setting member 105 as well as the actuating lever 51 of the switch.

FIG. 6a illustrates a shutter arrangement which is equipped with a selective setting member such as the one shown in FIG. 6. Accordingly, this shutter arrangement comprises a setting ring 110 which corresponds to the selective setting member and which is coupled to a sensing device (not shown in the drawing). Ring 110 serves, when the selective setting member 105 is in the "AUTO" position, for setting the diaphragm and the exposure time in response to the prevailing light conditions in accordance with the aforementioned program. The setting ring 110 is provided with a diaphragm cam 110a, as well as with an exposure time setting cam 110b, for this purpose. Although the transmission of the effect of the diaphragm cam 110a on the diaphragm lamellae 112 is effected by means of a three-armed diaphragm setting lever 113 in a manner similar to that of a shutter arrangement shown in FIG. 5a, the exposure time cam 110b acts on a rotatably positioned setting lever 114 which is operatively connected to the exposure time escapement mechanism of the shutter. In order to limit the diaphragm aperture range in the "AUTO" position of the selective setting member 105, the latter is provided with a ramp 105a which acts upon the diaphragm setting lever 113 in the same manner as set forth in connection with FIG. 5 so that a diaphragm aperture is set which is smaller than the largest aperture width of the objective. The cams 105b and 105c are formed on the selective setting member 105 on each side of the ramp 105a in accordance with the setting ranges "MANUAL-FLASH" and "MANUAL-B." The cams 105b and 105c become operative upon the diaphragm setting lever 113 when the selective setting member is switched to the respective setting range.

FIG. 7 shows an indicating device which is preferably used in cameras having a program exposure setting. This indicating device consists of a fixed viewing field 115 along with a pointer or indicator 117 which is rigidly connected to the rotating or moving coil 116 of the exposure meter. The bent end 117a of the indicator 117 moves in front of the viewing field 115. As is apparent from FIG. 7, the viewing field 115 is subdivided into a central indicating field 115a (green field) and two indicating fields 115b and 115c (red fields) adjoining the indicating field 115a at its lateral ends. The central indicating field 115a is adjusted to the limited exposure value range which is available when the selective setting member 105 is set in the "AUTO" position while the lateral indicating fields 115b and 115c indicate exposure values which are outside this limited exposure value range.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:
1. Photographic apparatus comprising:
(a) an objective lens;
(b) a focus control for setting said objective lens;
(c) a diaphragm having different aperture sizes;
(d) a selective setting member for controlling the aperture of said diaphragm and having two exposure setting ranges, one a complete exposure setting range and the second a limited exposure setting range, the resulting diaphragm apertures when said selective setting member is operating in said limited range being smaller than the largest aperture of said objective lens;
(e) and means interconnecting said focus control and said selective setting member for preventing said selective setting member from operating in said limited range unless said focus control occupies a predetermined position in which the largest possible diaphragm setting in said limited range produces a depth of focus which extends from a fixed near distance to infinity.

2. Photographic apparatus according to claim 1 wherein the focus control acts on a locking device which permits the selective setting member to be set at a point within the limited range only where the focus control occupies a predetermined position producing a depth of focus which extends from a fixed near distance to infinity and the selective setting member acts on the locking device to prevent the focus control from being switched from the predetermined position as long as the selective setting member is set at any point within the limited range.

3. Photographic apparatus according to claim 2 wherein the locking device has two levers which are non-rotatable relative to each other arranged on a rotatable shaft, one of the levers acting in conjunction with a recess provided in the focus control and the other lever acting in conjunction with an arresting edge provided on the selective setting member.

4. Photographic apparatus according to claim 1 wherein the focus control and the selective setting member are interconnected through gearing in such a manner that when the selective setting member is set to a specific setting within the limited range, the focus control is set in a position which produces a depth of focus which extends from a fixed near distance to infinity.

5. Photographic apparatus according to claim 4 wherein the focus control is provided with a driving arm and the selective setting member is provided with gear teeth and the gearing includes a first toothed rack, a first pinion meshing with the selective setting member and the first rack, a second toothed rack, and a second pinion meshing with the first and second racks, each of the racks being provided with driving lugs which act in conjunction with the driving arm of the focus control.

6. Photographic apparatus according to claim 4 wherein the focus control is provided with a driving arm and the selective setting member is provided with gear teeth and the gearing includes a first toothed ring, a first pinion meshing with the selective setting member and the first ring, a second toothed ring, and a second pinion meshing with the first and second rings, each of the rings being provided with driving lugs which act in conjunction with the driving arm on the focus control.

7. Photographic apparatus comprising:
(a) an objective lens;
(b) a focus control for setting said objective lens;
(c) a diaphragm having different aperture sizes;
(d) a selective setting member for controlling the aperture of said diaphragm and having two exposure setting ranges, one a complete exposure setting range and the second a limited exposure setting range, the resulting diaphragm apertures when said selective setting member is operating in said limited range being smaller than the largest aperture of said objective lens;
(e) an exposure time mechanism;
(f) an exposure time setting member for controlling said exposure time mechanism;
(g) means interconnecting said focus control and said selective member for preventing said selective setting member from operating in said limited range unless said focus control occupies a predetermined position in which the largest possible diaphragm setting in said limited range produces a depth of focus which extends from a fixed near distance to infinity;
(h) an exposure meter;
(i) means responsive to said exposure meter for setting at least one of the exposure factors of aperture size and exposure time;
(j) and circuit means responsive to said selective setting member and said focus control for permitting said exposure meter to control the setting of at least one of the exposure factors of aperture size and selective time when said exposure setting member is operating in said limited range and for short-circuiting said exposure meter when said selective setting member is operating in said complete range.

8. Photographic apparatus comprising:
(a) an objective lens;
(b) a focus control for setting said objective lens;
(c) a diaphragm having different aperture sizes;
(d) a selective setting member for controlling the aperture of said diaphragm and having two exposure setting ranges, one a complete exposure setting range and the second a limited exposure setting range, the resulting diaphragm apertures when said selective setting member is operating in said limited range being smaller than the largest aperture of said objective lens;
(e) an exposure time mechanism;
(f) an exposure time setting member for controlling said exposure time mechanism;
(g) means interconnecting said focus control and said selective setting member for preventing said selective setting member from operating in said limited range unless said focus control occupies a predetermined position in which the largest possible diaphragm setting in said limited range produces a depth of focus which extends from a fixed near distance to infinity;
(h) and means interconnecting said selective setting member and said exposure time setting member for setting said exposure time mechanism at a specific time when said selective setting member is operating in said limited range.

No references cited.

NORTON ANSHER, *Primary Examiner.*

J. F. PETERS, *Assistant Examiner.*